C. FISHBAUGH.

Chain-Pump.

No. 6,612. Reissued Aug. 24, 1875.

S. H. Whitehurst
L. V. Dunn.

Charles Fishbaugh
By Wilton C. Dunn
His Attorney

N. PETERS, PHOTO-LITHOGRAPHER, WASHINGTON, D. C.

UNITED STATES PATENT OFFICE.

CHARLES FISHBAUGH, OF TIFFIN, OHIO.

IMPROVEMENT IN CHAIN-PUMPS.

Specification forming part of Letters Patent No. 163,859, dated June 1, 1875; reissue No. 6,612, dated August 24, 1875; application filed August 11, 1875.

*To all whom it may concern:*

Be it known that I, CHARLES FISHBAUGH, of Tiffin, in the county of Seneca and State of Ohio, have invented a new and useful Improvement in Buckets for Chain-Pumps, which improvement is fully set forth in the following specification, reference being had to the accompanying drawings.

The nature of my said improvement is such that the buckets may be safely and easily drawn through the tube, and are prevented from falling backward when the pump is stopped.

The invention consists in providing the rubber collar forming the outer portion of the bucket with one or more radial slits extending a short distance from the periphery, which increase the elasticity of the rubber, and thus, when the bucket is drawn upward through the tube, allow it to contract sufficiently to facilitate the labor of pumping, and when the pump is stopped permit it to expand quickly and bind itself against the walls of the tube, preventing any backward movement of the chain, and securing the buckets against injury therefrom.

Figure 1:
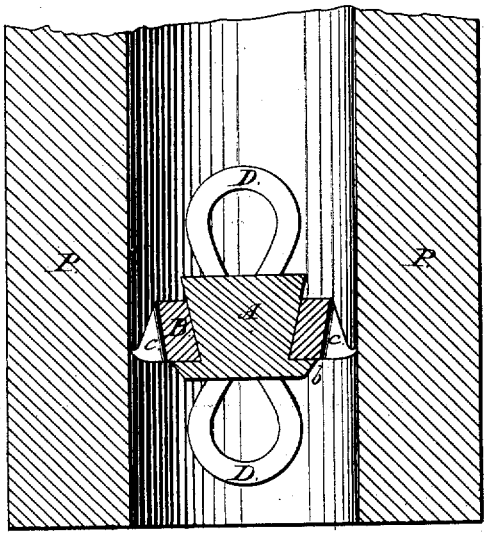
Figure 2:
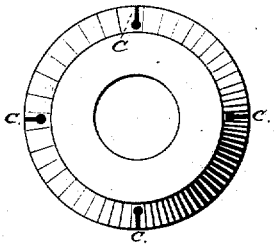

Figure 1 is a vertical section of the tube and bucket. Fig. 2 is a plan of the bucket.

Similar letters of reference indicate corresponding parts in both figures.

Referring to the drawings, P represents the pump-tube, made in the ordinary manner. A is a conical piece of metal, forming the core or center of the bucket, having the flange *b* and links D D to connect it with the chain. B is a rubber collar, having beveled periphery and conical eye, the latter fitting tightly the metal piece A, so as to hold itself firmly in position, as shown in Fig. 1. The beveled edge of the rubber collar is provided with the radial slits C, through which the small holes *d* are made. These holes may be of any desired form, and they may be made at the inner end of the slit, as in the illustration. The slits and holes in the rubber collar are intended to afford space for the contraction and expansion of the rubber, and thus increase its elasticity.

By the arrangement here described the working of the pump is rendered much easier than it would be were the edge of the rubber collar left solid, as the passage of the bucket is much facilitated by the contraction of the rubber collar when passing the joints, where the tube is measurably smaller in diameter than at other points. In addition to this advantage is that gained by preventing the chain from running backward, which tends to greatly injure the buckets. When the pump stops the slits allow the rubber collar to expand, and the sections into which it is divided immediately bind themselves against the walls of the tube, in the manner shown in Fig. 1, and they are held securely in that position, preventing the slightest backward movement of the chain, and thus obviating any possible injury to the buckets.

I do not confine myself to the use of any particular form of bucket, as my improvement is applicable to many kinds differing from the one shown in the drawing.

Having thus described my invention, what I claim is—

One or more radial slits, C, in the periphery of the rubber collar, substantially as described.

CHARLES FISHBAUGH.

Witnesses:
JAS. D. PATTEN,
W. C. DONN.